(12) United States Patent
Pastorina

(10) Patent No.: US 11,394,298 B2
(45) Date of Patent: Jul. 19, 2022

(54) VOLTAGE REGULATION SYSTEM INCLUDING A MULTI-USE PIN

(71) Applicant: Maxim Integrated Products, Inc., San Jose, CA (US)

(72) Inventor: Salvatore G. Pastorina, Catania (IT)

(73) Assignee: Maxim Integrated Products, Inc., San Jose, CA (US)

( * ) Notice: Subject to any disclaimer, the term of this patent is extended or adjusted under 35 U.S.C. 154(b) by 107 days.

(21) Appl. No.: 17/036,738

(22) Filed: Sep. 29, 2020

(65) Prior Publication Data

US 2021/0126532 A1 Apr. 29, 2021

Related U.S. Application Data

(60) Provisional application No. 62/925,951, filed on Oct. 25, 2019.

(51) Int. Cl.
*H02M 3/157* (2006.01)
*H02M 3/158* (2006.01)

(52) U.S. Cl.
CPC .......... *H02M 3/157* (2013.01); *H02M 3/158* (2013.01)

(58) Field of Classification Search
CPC .. H02M 1/0003; H02M 1/0012; H02M 3/003; H02M 3/156; H02M 3/157; H02M 3/158; H02M 7/003
See application file for complete search history.

(56) References Cited

U.S. PATENT DOCUMENTS

| 7,800,250 | B2* | 9/2010 | Hull | G11C 5/147 |
| | | | | 307/98 |
| 8,816,746 | B2 | 8/2014 | Wen et al. | |
| 9,024,607 | B2 | 5/2015 | Yang et al. | |
| 10,424,385 | B1* | 9/2019 | Tan | G11C 5/147 |
| 10,802,518 | B1* | 10/2020 | Luo | H02M 3/158 |
| 2018/0247678 | A1* | 8/2018 | Vergis | G11C 5/147 |
| 2022/0066486 | A1* | 3/2022 | Teo | G05F 1/46 |

OTHER PUBLICATIONS

"LIS2DH—MEMS digital output motion sensor: ultra low-power high performance 3 axis "femto" accelerometer," Doc ID 022516 Rev 1, www.st.com, Nov. 2011, pp. 49.

* cited by examiner

Primary Examiner — Matthew V Nguyen
(74) Attorney, Agent, or Firm — Kevin E. West; Advent, LLP

(57) ABSTRACT

A voltage regulation system can include a voltage regulator, a voltage regulation controller electrically coupled to the voltage regulator, and a multi-use pin configured to be electrically coupled to external circuits (e.g., an external ground, an external compensation circuit, a programmable resistor, an external reference voltage). The voltage regulation system can also include connection devices (e.g., multiple switches, such as transistor switches) configured to be in different connection device configurations, where each one of the connection device configurations enables an associated one of the external circuits via the multi-use pin. The voltage regulation system can also include a smart pin manager configured to determine when the multi-use pin is electrically coupled to one of the external circuits, and to cause the connection devices to be in one of the connection device configurations to enable the associated external circuit based upon the determination.

20 Claims, 9 Drawing Sheets

VOLTAGE REGULATION SYSTEM INCLUDING A MULTI-USE PIN

CROSS-REFERENCE TO RELATED APPLICATIONS

The present application claims the benefit under 35 U.S.C. § 119(e) of U.S. Provisional Application Ser. No. 62/925,951, filed Oct. 25, 2019, and titled "A VOLTAGE REGULATION SYSTEM INCLUDING A MULTI-USE PIN," which is herein incorporated by reference in its entirety.

BACKGROUND

Voltage regulation systems are often designed as a semiconductor chip. The voltage regulation system semiconductor chip may include a number of different single use pins where each of the single use pins is specifically designed to be electrically coupled to a specific external circuit that may enhance the operation of the voltage regulation system. For example, the voltage regulation system semiconductor chip may include a first single use pin that is specifically designed to only be electrically coupled to an external ground, a second single use pin that is specifically designed to only be electrically coupled to an external compensation circuit, a third single use pin that is specifically designed to only be electrically coupled to a programmable resistor, and a fourth pin that is specifically designed to be electrically coupled to a reference voltage.

The use of multiple dedicated single use pins may increase the footprint of the voltage regulation system semiconductor chip.

DRAWINGS

The Detailed Description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

Figure 1:
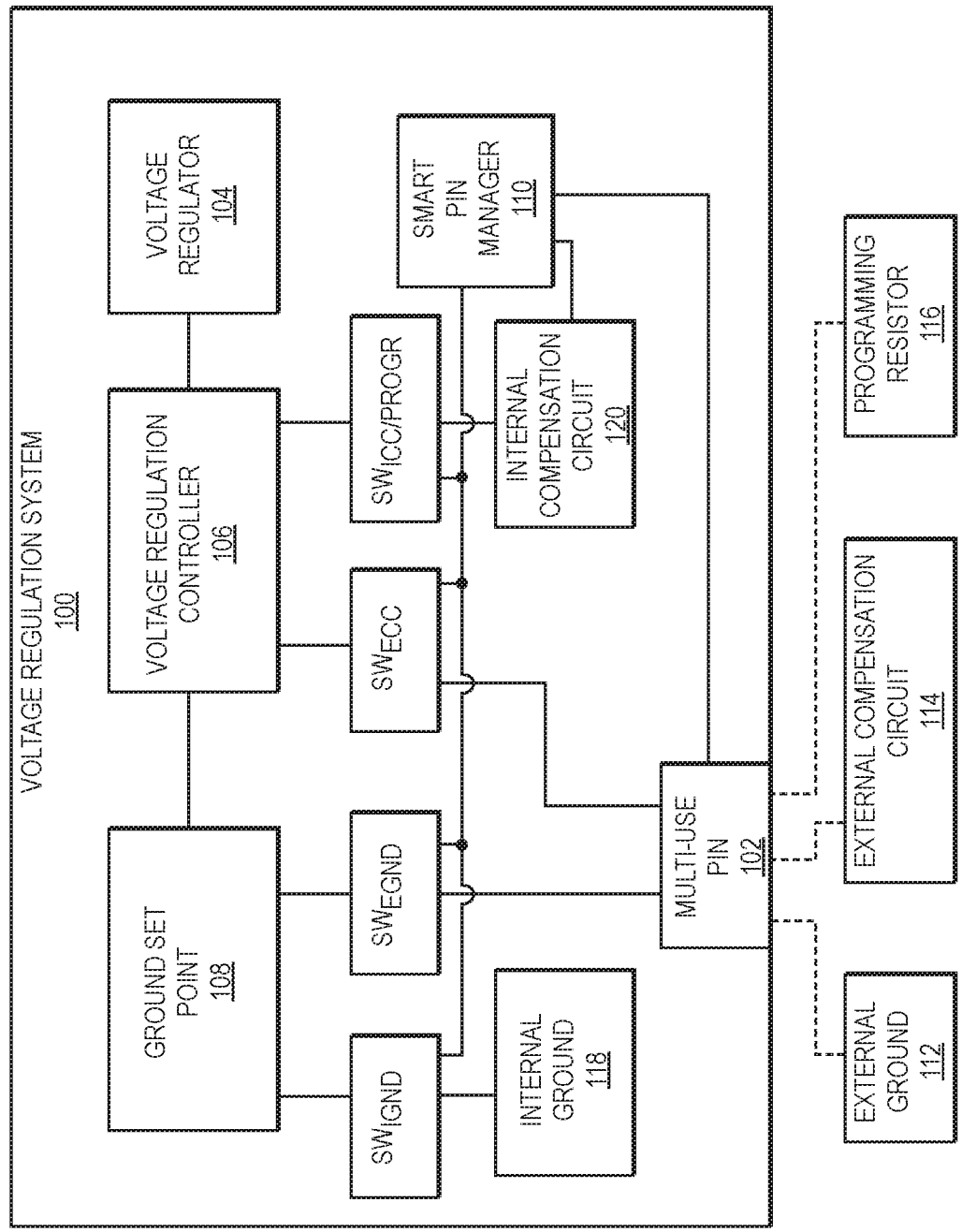
FIG. 1 is a block diagram representation of an embodiment of a voltage regulation system including a multi-use pin.

A regulation system (e.g., a voltage regulation system) includes a multi-use pin. A user is provided with the option of electrically coupling one of a number of different external circuits to the multi-use pin to improve the operation of the regulation system. Examples of such external circuits include, but are not limited to, a reference voltage, an external ground, an external compensation circuit, and a programmable resistor. The voltage regulation system includes a smart pin manager, devices for establishing and interrupting electrical connections (e.g., switches or other connection devices), an internal ground, and an internal compensation circuit. The connection devices can be in different connection configurations. The smart pin manager determines whether the user has electrically coupled the multi-use pin to a reference voltage, to an external ground, to an external compensation circuit or to a programmable resistor, for example. The smart pin manager places the connection devices in one of the number of different connection configurations associated with the specific circuit that the user has chosen to electrically couple to the multi-use pin thereby enabling the voltage regulation system to use the specific circuit that has been electrically coupled to the multi-use pin.

In an embodiment, a voltage regulation system includes a voltage regulator, a voltage regulation controller, a multi-use pin, devices for establishing and interrupting electrical connections (e.g., switches or other connection devices), and a smart pin manager. The voltage regulation controller is electrically coupled to the voltage regulator. The multi-use pin is configured to be electrically coupled to one of an external ground, an external compensation circuit, and a programmable resistor, for example. The connection devices are configured to be in different connection configurations. Each of the connection configurations enables the use of an associated one of the external ground, the external compensation circuit, and the programmable resistor via the multi-use pin. The smart pin manager is electrically coupled to the multi-use pin, the connection devices, and the voltage regulation controller. The smart pin manager is configured to determine whether the multi-use pin has been electrically coupled to one of the external ground, the external compensation circuit, and the programmable resistor, and place the connection devices in one of the connection configurations based on the determination.

In an embodiment, a voltage regulation system includes a voltage regulator, a voltage regulation controller, a multi-use pin, devices for establishing and interrupting electrical connections (e.g., switches or other connection devices), and a smart pin manager. The voltage regulation controller is electrically coupled to the voltage regulator. The multi-use pin is configured to be electrically coupled to one of an external ground and an external compensation circuit, for example. The connection devices are configured to be in different connection configurations. Each of the connection configurations enables the use of an associated one of the external ground and the external compensation circuit via the multi-use pin. The smart pin manager is electrically coupled to the multi-use pin, the connection devices, and the voltage regulation controller. The smart pin manager is configured to determine whether the multi-use pin has been electrically coupled to one of the external ground and the external compensation circuit, and place the connection devices in one of the connection configurations based on the determination.

In an embodiment, a voltage regulation system includes a voltage regulator, a voltage regulation controller, a multi-use pin, devices for establishing and interrupting electrical connections (e.g., switches or other connection devices), and a smart pin manager. The voltage regulation controller is electrically coupled to the voltage regulator. The multi-use pin is configured to be electrically coupled to one of an external ground and a programmable resistor, for example. The connection devices are configured to be in different connection configurations. Each of the different connection configurations enables the use of an associated one of the external ground and the programmable resistor via the multi-use pin. The smart pin manager is electrically coupled to the multi-use pin, the connection devices, and the voltage regulation controller. The smart pin manager is configured to determine whether the multi-use pin has been electrically coupled to one of the external ground and the programmable resistor, and place the connection devices in one of the connection configurations based on the determination.

In an embodiment, a voltage regulation system includes a voltage regulator, a voltage regulation controller, a multi-use pin, devices for establishing and interrupting electrical connections (e.g., switches or other connection devices), and a smart pin manager. The voltage regulation controller is electrically coupled to the voltage regulator. The multi-use pin is configured to be electrically coupled to one of an external compensation circuit and a programmable resistor, for example. The connection devices are configured to be in different connection configurations. Each of the different connection configurations enables the use of an associated one of the external compensation circuit and the programmable resistor via the multi-use pin. The smart pin manager is electrically coupled to the multi-use pin, the connection devices, and the voltage regulation controller. The smart pin manager is configured to determine whether the multi-use pin has been electrically coupled to one of the external compensation circuit and the programmable resistor, and place the connection devices in one of the connection configurations based on the determination.

In an embodiment, a voltage regulation system includes a voltage regulator, a voltage regulation controller, a multi-use pin, devices for establishing and interrupting electrical connections (e.g., switches or other connection devices), and a smart pin manager. The voltage regulation controller is electrically coupled to the voltage regulator. The multi-use pin is configured to be electrically coupled to one of a reference voltage, an external ground, an external compensation circuit, and a programmable resistor, for example. The connection devices are configured to be in different connection configurations. Each of the different connection configurations enables the use of an associated one of the reference voltage, the external ground, the external compensation circuit, and the programmable resistor via the multi-use pin. The smart pin manager is electrically coupled to the multi-use pin, the connection devices, and the voltage regulation controller. The smart pin manager is configured to determine whether the multi-use pin has been electrically coupled to one of the reference voltage, the external ground, the external compensation circuit, and the programmable resistor, and place the connection devices in one of the connection configurations based on the determination.

Example Implementations

Referring to FIG. 1, a block diagram representation of an example of a voltage regulation system 100 including an embodiment of a multi-use pin 102 is shown. The voltage regulation system 100 includes a voltage regulator 104, a voltage regulation controller 106, an electrical ground (e.g., a ground set point 108), a smart pin manager 110, and devices for establishing and interrupting electrical connections (e.g., connection devices $SW_{IGND}$, $SW_{EGND}$, $SW_{ICC/PROGR}$, $SW_{ECC}$). In some embodiments, one or more of the connection devices can be switches, such as transistor switches, e.g., field-effect transistor (FET) switches. A connection device can also be implemented as a logic switch, such as a three-state or tri-state switch (e.g., including an "on" or "1" logic state, an "off" or "0" logic state, and a high impedance state). The voltage regulation system 100 may include additional components that facilitate operation of the voltage regulation system 100 (not shown in FIG. 1). Examples of voltage regulation systems 100 include but are not necessarily limited to, a step up AC to AC converter, a step down AC to AC converter, a step up AC to DC converter, a step down AC to DC converter, a step up DC to DC converter, step down DC to DC converter, a step up DC to AC converter, a step down DC to AC converter, control loop circuitry, filter circuitry (e.g., band-pass filter circuitry), and so forth. While a number of different voltage regulation systems 100 have been described, other types of voltage regulations systems may be used. In an embodiment, the voltage regulation system 100 is implemented in an integrated circuit.

In an embodiment, the ground set point 108 is a component of the voltage regulation controller 106. In an embodiment, the smart pin manager 110 is a component of the voltage regulation controller 106. In an embodiment, the ground set point 108 and the smart pin manager 110 are both components of the voltage regulation controller 106.

In an embodiment, the multi-use pin 102 is configured to be electrically coupled to one of an external ground 112, an external compensation circuit 114, and a programmable resistor 116, thereby providing a user with the option of electrically coupling the multi-use pin 102 to an external ground 112, an external compensation circuit 114, or a programmable resistor 116. The smart pin manager 110 is electrically coupled to the multi-use pin 102 and the connection devices $SW_{IGND}$, $SW_{EGND}$, $SW_{ICC/PROGR}$, $SW_{ECC}$. The smart pin manager 110 determines whether the multi-use pin 102 is electrically coupled to an external ground 112, an external compensation circuit 114, or a programmable resistor 116, and responsively manipulates one or more of the connection devices $SW_{IGND}$, $SW_{EGND}$, $SW_{ICC/PROGR}$, $SW_{ECC}$ based on the determination. The connection devices $SW_{IGND}$, $SW_{EGND}$, $SW_{ICC/PROGR}$, $SW_{ECC}$ include an internal ground connection device $SW_{IGND}$, an external ground connection device $SW_{EGND}$, an internal compensation circuit/programmable resistor connection device $SW_{ICC/PROGR}$, and an external compensation circuit connection device $SW_{ECC}$.

When the internal ground connection device $SW_{IGND}$ is in a disconnecting (e.g., open) state, the internal ground connection device $SW_{IGND}$ electrically disengages the ground set point 108 from an internal ground 118. When the internal ground connection device $SW_{IGND}$ is in a connecting (e.g., closed) state, the internal ground connection device $SW_{IGND}$ electrically couples the ground set point 108 to the internal ground 118.

When the external ground connection device $SW_{EGND}$ is in a disconnecting (e.g., open) state, the external ground connection device $SW_{EGND}$ electrically disengages the ground set point 108 from the multi-use pin 102. When the external ground connection device $SW_{EGND}$ is in a connecting (e.g., closed) state, the external ground connection device $SW_{EGND}$ electrically couples the ground set point 108 to the multi-use pin 102. When an external ground 112 is electrically coupled to the multi-use pin 102, connecting the external ground connection device $SW_{EGND}$ electrically couples the ground set point 108 to the external ground 112 via the multi-use pin 102.

When one of the internal ground connection device $SW_{IGND}$ and the external ground connection device $SW_{EGND}$ is in a disconnecting (e.g., open) state, the other one of the internal ground connection device $SW_{IGND}$ and the external ground connection device $SW_{EGND}$ is in a connecting (e.g., closed) state. In an embodiment, a default state for the internal ground connection device $SW_{IGND}$ is the connecting state and a default state for the external ground connection device $SW_{EGND}$ is the disconnecting state.

When the internal compensation circuit/programmable resistor connection device $SW_{ICC/PROM}$ is in a disconnecting state, the internal compensation circuit/programmable resistor connection device $SW_{ICC/PROM}$ electrically disengages the voltage regulation controller 106 from the internal compensation circuit 120. When the internal compensation circuit/programmable resistor connection device $SW_{ICC/PROM}$ is in a connecting state, the internal compensation circuit/programmable resistor connection device $SW_{ICC/PROM}$ electrically couples the voltage regulation controller 106 to the internal compensation circuit 120.

When the external compensation circuit connection device $SW_{ECC}$ is in a disconnecting state, the voltage regulation controller is 106 disengaged from the multi-use pin 102. When the external compensation circuit connection device $SW_{ECC}$ is in a connecting state, the voltage regulation controller 106 is electrically coupled to the multi-use pin 102.

The external compensation circuit connection device $SW_{ECC}$ is in the connecting state when the multi-use pin 102 has been electrically coupled to an external compensation circuit 114. In an embodiment, a default state for the internal compensation circuit connection device $SW_{ICC/PROG}$ is a connecting state and a default state for the external compensation circuit connection device $SW_{ECC}$ is a disconnecting state. In an embodiment, the voltage regulation controller 106 is electrically coupled to the multi-use pin 102 when an external compensation circuit 114 has been electrically coupled to the multi-use pin 102.

If an external compensation circuit 114 has not been electrically coupled to the multi-use pin 102 the voltage regulation controller 106 is electrically coupled to the internal compensation circuit 120. In other words, when an external ground 112 or a programmable resistor 116 has been electrically coupled to the multi-use pin 102, the external compensation circuit connection device $SW_{ECC}$ is in a disconnecting state thereby disengaging the multi-use pin 102 from the voltage regulation controller 106 and the internal compensation circuit/programmable resistor connection device $SW_{ICC/PROM}$ is in a connecting state thereby electrically coupling the internal compensation circuit 120 with the voltage regulation controller 106.

While a particular configuration of connection devices $SW_{IGND}$, $SW_{EGND}$, $SW_{ICC/PROGR}$, $SW_{ECC}$ is described, other configurations of connection devices may be used in the voltage regulation system 100.

Figure 2:
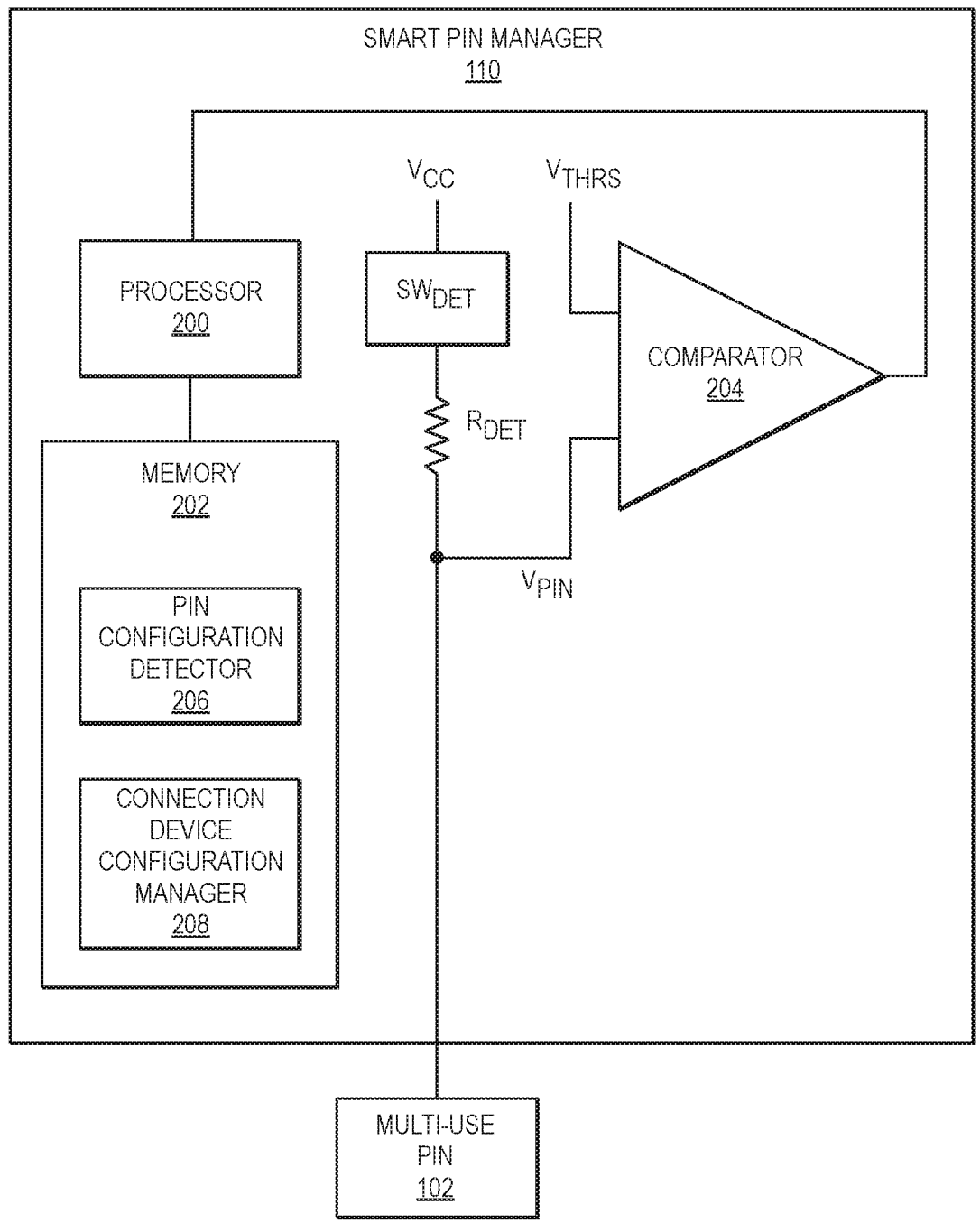
FIG. 2 is a block diagram representation of an embodiment of a smart pin manager for an embodiment of a voltage regulation system including a multi-use pin.

Referring to FIG. 2, a block diagram representation of an embodiment of a smart pin manager 110 is shown. As previously discussed, the smart pin manager 110 is electrically coupled to the multi-use pin 102. In an embodiment, the smart pin manager 110 determines whether the multi-use pin 102 is electrically coupled to an external ground 112, an external compensation circuit 114, or a programmable resistor 116 and responsively manipulates one or more of the connection devices $SW_{IGND}$, $SW_{EGND}$, $SW_{ICC/PROGR}$, $SW_{ECC}$ based on the determination.

In an embodiment, the smart pin manager 110 includes at least one processor 200, at least one memory 202, a detection connection device $SW_{DET}$, and a comparator 204. A pin configuration detector 206 and a connection device configuration manager 208 respectively store their configurations in the memory 202. The at least one processor 200 is electrically coupled to the at least one memory 202. In embodiments, the pin configuration detector 206 and the connection device configuration manager 208 represent executable instructions (e.g., program code) that perform specified tasks as more fully described below when executed on the processor 200.

The detection connection device $SW_{DET}$ is electrically coupled to the multi-use pin 102 and configured to be electrically coupled to a voltage source $V_{CC}$. When the detection connection device $SW_{DET}$ is in a connecting state, the multi-use pin 102 is electrically coupled to the voltage source $V_{CC}$. When the detection connection device $SW_{DET}$ is in a disconnecting state, the multi-use pin 102 is electrically disengaged from the voltage source $V_{CC}$. In an embodiment, a resistor $R_{DET}$ is disposed between the detection connection device $SW_{DET}$ and the multi-use pin 102.

The comparator 204 has a first input electrically coupled to the multi-use pin 102 and a second input electrically coupled to a threshold voltage $V_{THRS}$ source. The output of the comparator 204 is electrically coupled to the processor 200. The comparator 204 is configured to receive the voltage $V_{PIN}$ at the multi-use pin 102 and the threshold voltage $V_{THRS}$ as inputs and responsively generate an output based on a comparison of the voltage $V_{PIN}$ at the multi-use pin 102 with the threshold voltage $V_{THRS}$.

In an embodiment, the pin configuration detector 206 determines whether the multi-use pin 102 is electrically coupled to an external ground 112, to an external compensation circuit 114, or to a programmable resistor 116. The connection device configuration manager 208 manages the configuration of the connection devices $SW_{IGND}$, $SW_{EGND}$, $SW_{ICC/PROGR}$, $SW_{ECC}$ based on the determination made by the pin configuration detector 206.

Figure 3:
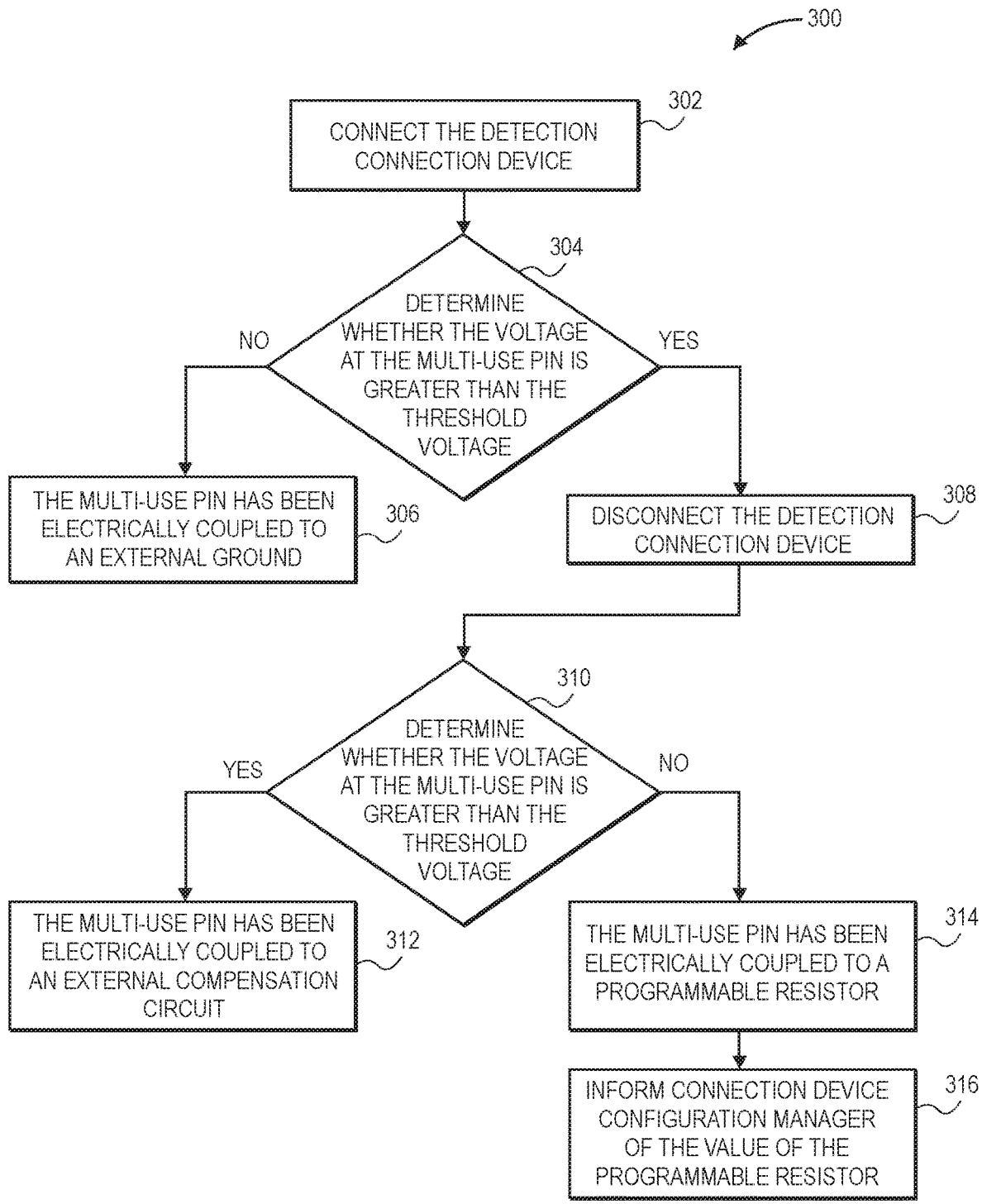
FIG. 3 is a flow diagram representation of an example of a method of detecting whether a multi-use pin of an embodiment of a voltage regulation system is electrically coupled to an external ground, to an external compensation circuit, or to a programmable resistor.

Referring to FIG. 3, a flow diagram representation of an example of a method 300 of detecting whether the multi-use pin 102 of an embodiment of a voltage regulation system 100 is electrically coupled to an external ground 112, an external compensation circuit 114, or a programmable resistor 116 is described. As mentioned above, the smart pin manager 110 includes the pin configuration detector 206. The pin configuration detector 206 detects whether the multi-use pin 102 is electrically coupled to an external ground 112, an external compensation circuit 114, or a programmable resistor 116.

At 302, the pin configuration detector 206 connects the detection connection device $SW_{DET}$ thereby electrically coupling the multi-use pin 102 to the voltage source $V_{CC}$. The voltage $V_{PIN}$ at the multi-use pin 102 is received at the first input of the comparator at 204. The threshold voltage $V_{THRS}$ is supplied to the second input of the comparator 204. The comparator 204 compares the voltage $V_{PIN}$ at the multi-use pin 102 with the threshold voltage $V_{THRS}$ and responsively generates an output based on the comparison. At 304, the pin configuration detector 206 determines whether the voltage $V_{PIN}$ at the multi-use pin 102 is greater than the threshold voltage $V_{THRS}$ based on the output generated by the comparator 204. In an embodiment, the pin configuration detector 206 makes the determination at a first evaluation time $T_{EVAL1}$ following the connecting of the detection connection device $SW_{DET}$.

If the pin configuration detector 206 determines that the voltage $V_{PIN}$ at the multi-use pin 102 is not greater than the threshold voltage $V_{THRS}$ at the time $T_{EVAL1}$, the pin configuration detector 206 determines that the multi-use pin 102 has been electrically coupled to an external ground 112 at 306. When the multi-use pin 102 is connected to an external ground 112, the voltage $V_{PIN}$ at the multi-use pin 102 fails to rise above the threshold voltage $V_{THRS}$. The pin configuration detector 206 informs the connection device configuration manager 208 that the multi-use pin 102 has been electrically coupled to an external ground 112.

If, at 304, the pin configuration detector 206 determines that the voltage $V_{PIN}$ at the multi-use pin 102 is greater than the threshold voltage $V_{THRS}$ at the time $T_{EVAL1}$, the pin configuration detector 206 determines whether an external compensation circuit 114 is electrically coupled to the multi-use pin 102.

An external compensation circuit 114 includes an external compensation resistor $R_{COMP}$ and an external compensation capacitor $C_{COMP}$. When the multi-use pin 102 is electrically coupled to an external compensation circuit 114, closing the detection connection device $SW_{DET}$ causes the external compensation capacitor $C_{COMP}$ to be charged by $V_{CC}$ through the detection resistor $R_{DET}$ and the external compensation resistor $R_{COMP}$ to an external compensation capacitor voltage of $V(C_{COMP}, T_{EVAL1})$ at the time $T_{EVAL1}$. The voltage $V_{PIN}$ at the multi-use pin 102 is at least approximately equal to (e.g., equal to, almost equal to) the external compensation capacitor voltage of $V(C_{COMP}, T_{EVAL1})$.

The value of the threshold voltage $V_{THRS}$ is established based on the expected value of the external compensation capacitor voltage of $V(C_{COMP}, T_{EVAL1})$ at the time $T_{EVAL1}$ as defined by Equation (1) below:

$$V(C_{COMP}, T_{EVAL1}) = V_{CC}\left[1 - \exp^{-\frac{T_{EVAL1}}{(R_{DET}+R_{COMP})C_{COMP}}}\right] \quad \text{Equation (1)}$$

The value of the threshold voltage $V_{THRS}$ is set so that the external compensation capacitor voltage of $V(C_{COMP}, T_{EVAL1})$ is greater than the threshold voltage $V_{THRS}$ across external compensation capacitor $C_{COMP}$ and external compensation resistor $R_{COMP}$ values that may be employed in an external compensation circuit 114 at the first evaluation time $T_{EVAL1}$.

For instance, in an example where $T_{EVAL1}$ is equal to about one hundred microseconds (100 µs), $C_{COMP}$ is equal to about nine and one-half nano-farads (9.5 nF), $R_{COMP}$ is equal to about eight kiloohms (8 kOhm), $R_{DET}$ is equal to about twelve kiloohms (12 kOhm), and $V_{CC}$ is equal to about five volts (5 V), then $V(C_{COMP}, T_{EVAL1})$ is equal to about two and five one-hundredths volts (2.05 V). In this example, if $V_{THRS}$ is equal to about two volts (2 V), combinations of $R_{COMP}$ and $C_{COMP}$ where $R_{COMP}$ multiplied by $C_{COMP}$ is less than about one and nine-tenths multiplied by ten to the power of minus four (1.9E-4) may be detected. It will be appreciated that a lower value for $V_{THRS}$ and/or a greater value for $T_{EVAL1}$ can allow for the use of greater $R_{COMP}$ and $C_{COMP}$ values in this example.

If the pin configuration detector 206 determines that the voltage $V_{PIN}$ at the multi-use pin 102 is greater than the threshold voltage $V_{THRS}$ at the first evaluation time $T_{EVAL1}$, the pin configuration detector 206 disconnects the detection connection device $SW_{DET}$ at 308. At 310, the pin configuration detector 206 determines whether the voltage $V_{PIN}$ at the multi-use pin 102 is greater than the threshold voltage $V_{THRS}$ at a second evaluation time $T_{EVAL2}$.

When the multi-use pin 102 is electrically coupled to an external compensation circuit 114, upon the disconnecting of the detection connection device $SW_{DET}$, the multi-use pin 102 is in a floating state and the voltage $V_{PIN}$ remains above the threshold voltage $V_{THRS}$.

If the pin configuration detector 206 determines that the voltage $V_{PIN}$ at the multi-use pin 102 is greater than the $V_{THRS}$ at the second evaluation time $T_{EVAL2}$, the pin configuration detector 206 determines that the multi-use pin 102 has been electrically coupled to an external compensation circuit 114 at 312. The pin configuration detector 206 informs the connection device configuration manager 208 that the multi-use pin 102 has been electrically coupled to an external compensation circuit 114.

When a programmable resistor 116 having a value of $R_{PROG}$ is electrically coupled to the multi-use pin 102, upon the connecting of the detection connection device $SW_{DET}$ at 302, the voltage $V_{CC}$ is partitioned between the detection resistor $R_{DET}$ and the programmable resistor 116 having the value of $R_{PROG}$. The voltage $V_{PIN}$ at the multi-use pin 102 can be calculated using Equation (2) below:

$$V_{PIN} = V_{CC} \frac{R_{PROG}}{R_{PROG} + R_{DET}} \quad \text{Equation (2)}$$

In embodiments, the threshold voltage $V_{THRS}$ is set so that the voltage $V_{PIN}$ is greater than the threshold voltage $V_{THRS}$ when a programmable resistor 116 is electrically coupled to the multi-use pin 102 for different values of the programmable resistor $R_{PROG}$ that may be employed.

In an example where $R_{DET}$ is equal to about twelve kiloohms (12 kOhm), $V_{CC}$ is equal to about five volts (5 V), and $V_{THRS}$ is equal to about two volts (2 V), the minimum $R_{PROG}$ value, $R_{PROG\_MIN}$, is about eight kiloohms (8 kOhm), and thus values greater than about eight kiloohms (8 kOhm) may be used for $R_{PROG}$. It should be noted that lower values for $V_{THRS}$ can allow for lower $R_{PROG\_MIN}$ values in this example.

When the multi-use pin 102 has been electrically coupled to a programmable resistor 116, disconnecting the detection connection device SWEET at 308, causes the voltage $V_{PIN}$ at the multi-use pin 102 to drop down to ground and the voltage at the multi-use pin 102 falls below the threshold voltage $V_{THRS}$.

Accordingly, if pin configuration detector 206 determines that the voltage $V_{PIN}$ at the multi-use pin 102 is not greater than the threshold voltage $V_{THRS}$ at the second evaluation time $T_{EVAL2}$, the pin configuration detector 206 determines that the multi-use pin 102 has been electrically coupled to a programmable resistor 116 at 314. The pin configuration detector 206 informs the connection device configuration manager 208 that the multi-use pin 102 has been electrically coupled to a programmable resistor 116. At 316, the pin configuration detector 206 informs the connection device configuration manager 208 of the value $R_{PROG}$ of the programmable resistor 116 that has been electrically coupled to the multi-use pin 102.

While a series of steps have been described in connection with the method 300, a fewer number of the described steps and/or additional steps may be performed. Furthermore, while the steps have been described in a particular order, the steps in method 300 may be performed in a different order.

Figure 4:
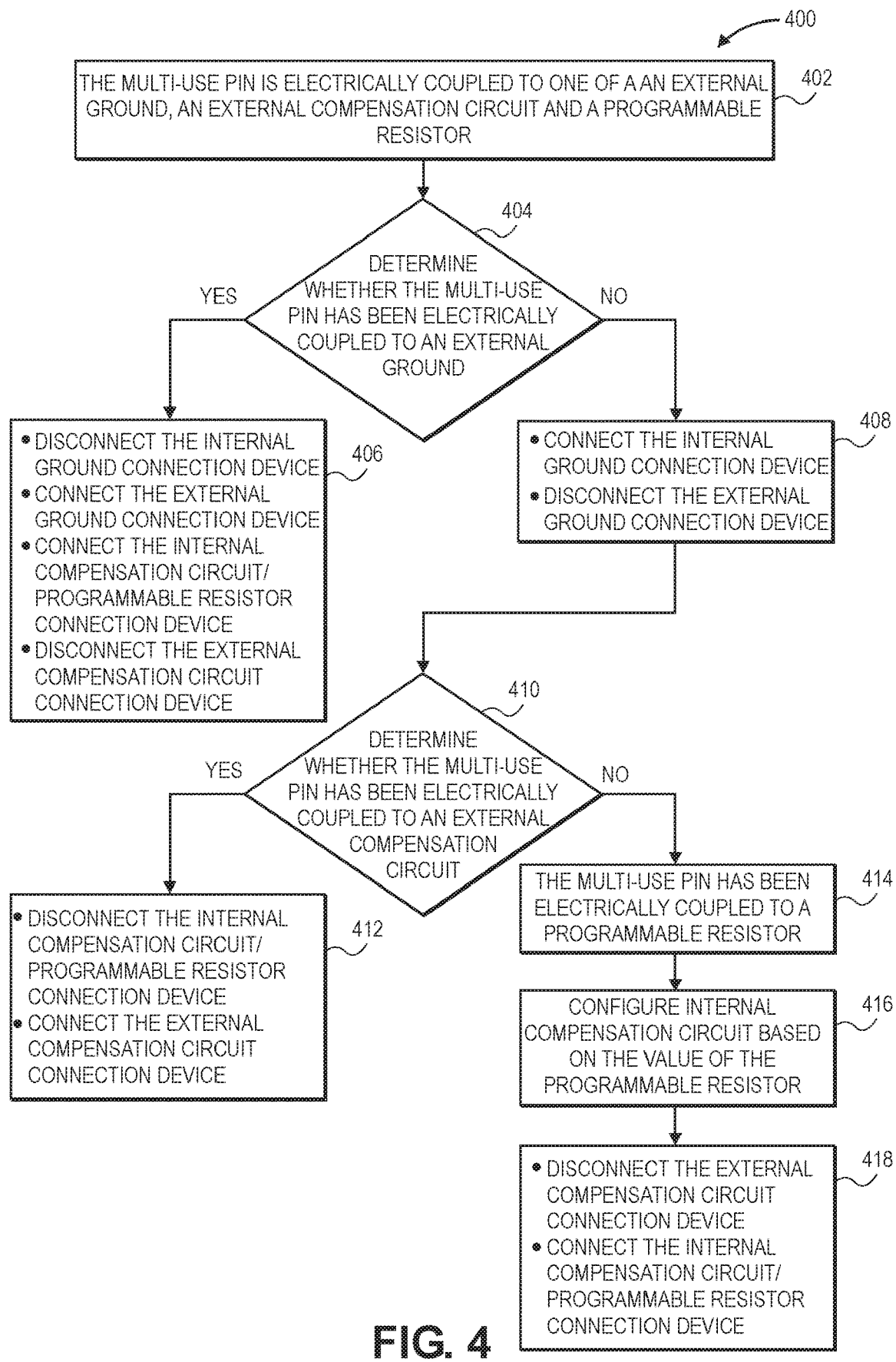
FIG. 4 is a flow diagram representation of an example of a method using an embodiment of a voltage regulation system including a multi-use pin.

Referring to FIG. 4, a flow chart representation of a method 400 of using the voltage regulation system 100 with the multi-use pin 102 is described. The multi-use pin 102 is electrically coupled to one of an external ground 112, an external compensation circuit 114, and a programmable resistor 116 at 402.

The pin configuration detector 206 detects whether the multi-use pin 102 has been electrically coupled to an external ground 112 at 404. If the pin configuration detector 206 determines that the multi-use pin 102 has been electrically coupled to an external ground 112, the connection device configuration manager 208 disconnects the internal ground connection device $SW_{IGND}$ thereby electrically disengaging the internal ground 118 from the ground set point 108, connects the external ground connection device $SW_{EGND}$ thereby electrically coupling the external ground 112 to the ground set point 108 via the multi-use pin 102, connects the internal compensation circuit/programmable resistor connection device $SW_{ICC/PROGR}$ thereby electrically coupling the internal compensation circuit 120 to the voltage regulation controller 106, and disconnects the external compensation circuit connection device $SW_{ECC}$ thereby disengaging the voltage regulation controller 106 from the multi-use pin 102 at 406.

The ground set point 108 is configured to perform error correction and sets the ground to be used by the voltage regulation system 100. The ground set point 108 receives the external ground 112 as an input and generates an error correction signal based on a difference between the received external ground 112 and internal ground. The voltage regulation controller 106 receives the error correction signal and uses the error correction signal to adjust the internal ground and uses the adjusted ground to perform voltage regulation functions.

If the pin configuration detector 206 determines that the multi-use pin 102 has not been electrically coupled to an external ground 112, the connection device configuration manager 208 connects the internal ground connection device $SW_{IGND}$ thereby electrically coupling the ground set point 108 to the internal ground 118 and disconnects the external ground connection device $SW_{EGND}$ thereby electrically disengaging the multi-use pin 102 from the ground set point 108 at 408.

The ground set point 108 receives the internal ground 118 as an input. Since the difference between the received internal ground 118 and internal ground is at least approximately zero, there is not necessarily any error correction performed by the ground set point 108. The voltage regulation controller 106 uses the internal ground 118 to perform voltage regulation functions.

The pin configuration detector 206 determines whether the multi-use pin 102 has been electrically coupled to an external compensation circuit 114 at 410. If the pin configuration detector 206 determines that the multi-use pin 102 has been electrically coupled to an external compensation circuit 114, the connection device configuration manager 208 disconnects the internal compensation circuit/programmable resistor connection device $SW_{ICC/PROGR}$ thereby electrically disengaging the internal compensation circuit 120 from the voltage regulation controller 106 and connects the external compensation circuit connection device $SW_{ECC}$ thereby electrically coupling the external compensation circuit 114 to the voltage regulation controller 106 via the multi-use pin 102 at 412. The voltage regulation controller 106 uses the external compensation circuit 114 to perform voltage regulation functions.

If the pin configuration detector 206 determines that the multi-use pin 102 has not been electrically coupled to an external compensation circuit 114, the pin configuration detector 206 determines that the multi-use pin 102 has been electrically coupled to a programmable resistor 116 at 414.

The connection device configuration manager 208 receives the value $R_{PROG}$ of the programmable resistor 116 from the pin configuration detector 206. At 416, the connection device configuration manager 208 configures the internal compensation circuit 120 based on the received value $R_{PROG}$ of the programmable resistor 116. The connection device configuration manager 208 connects the internal compensation circuit/programmable resistor connection device $SW_{ICC/PROGR}$ thereby electrically coupling the configured internal compensation circuit 120 to the voltage regulation controller 106 and disconnects the external compensation circuit connection device $SW_{ECC}$ thereby electrically disengaging the multi-use pin 102 from the voltage regulation controller 106 at 418.

Different values of $R_{PROG}$ of the programmable resistor 116 are associated with different internal compensation circuit 120 configurations. The internal compensation circuit 120 includes at least one internal compensation resistor Rico and at least one internal compensation capacitor $C_{ICOMP}$. Each of the different internal compensation circuit 120 configurations has an associated value for the internal compensation resistor % comp and the internal compensation capacitor $C_{ICOMP}$. The setting for the specific configuration of the internal compensation circuit 120 is encoded in the value $R_{PROG}$ of the programmable resistor 116. When the connection device configuration manager 208 receives the value $R_{PROG}$ of the programmable resistor 116 from the pin configuration detector 206, the connection device configuration manager 208 identifies the specific internal compensation circuit 120 configuration associated with the received value $R_{PROG}$ of the programmable resistor 116. The connection device configuration manager configures the internal compensation circuit 120 based on the value $R_{PROG}$ of the programmable resistor 116 at 416. While a series of steps have been described in connection with the method 400, a fewer number of the described steps and/or additional steps may be performed. Furthermore, while the steps have been described in a particular order, the steps in method 400 may be performed in a different order.

Figure 5A:
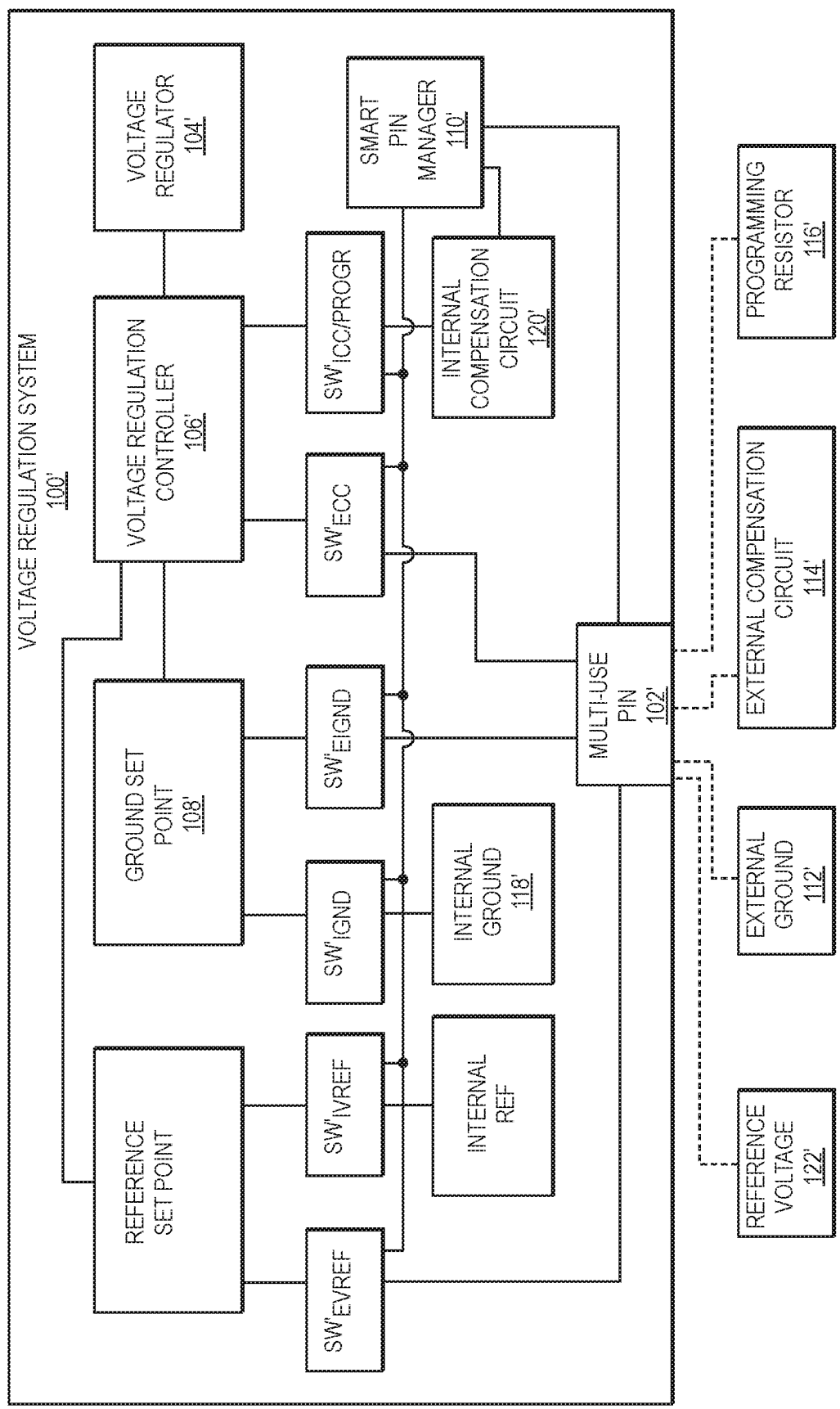
FIG. 5A is a block diagram representation of an embodiment of a voltage regulation system including a multi-use pin.

Referring to FIG. 5A, a block diagram representation of an example of a voltage regulation system 100' including an embodiment of a multi-use pin 102' is shown. The voltage regulation system 100' includes a voltage regulator 104', a voltage regulation controller 106', a ground set point 108', a smart pin manager 110', and devices for establishing and interrupting electrical connections (e.g., connection devices $SW'_{IGND}$, $SW'_{EGND}$, $SW'_{ICC/PROGR}$, $SW'_{ECC}$, $SW'_{IVREF}$, $SW'_{EVREF}$). In an embodiment, the multi-use pin 102' is configured to be electrically coupled to one of an external ground 112', an external compensation circuit 114', a programmable resistor 116', and a reference voltage 122'.

Figure 5B:
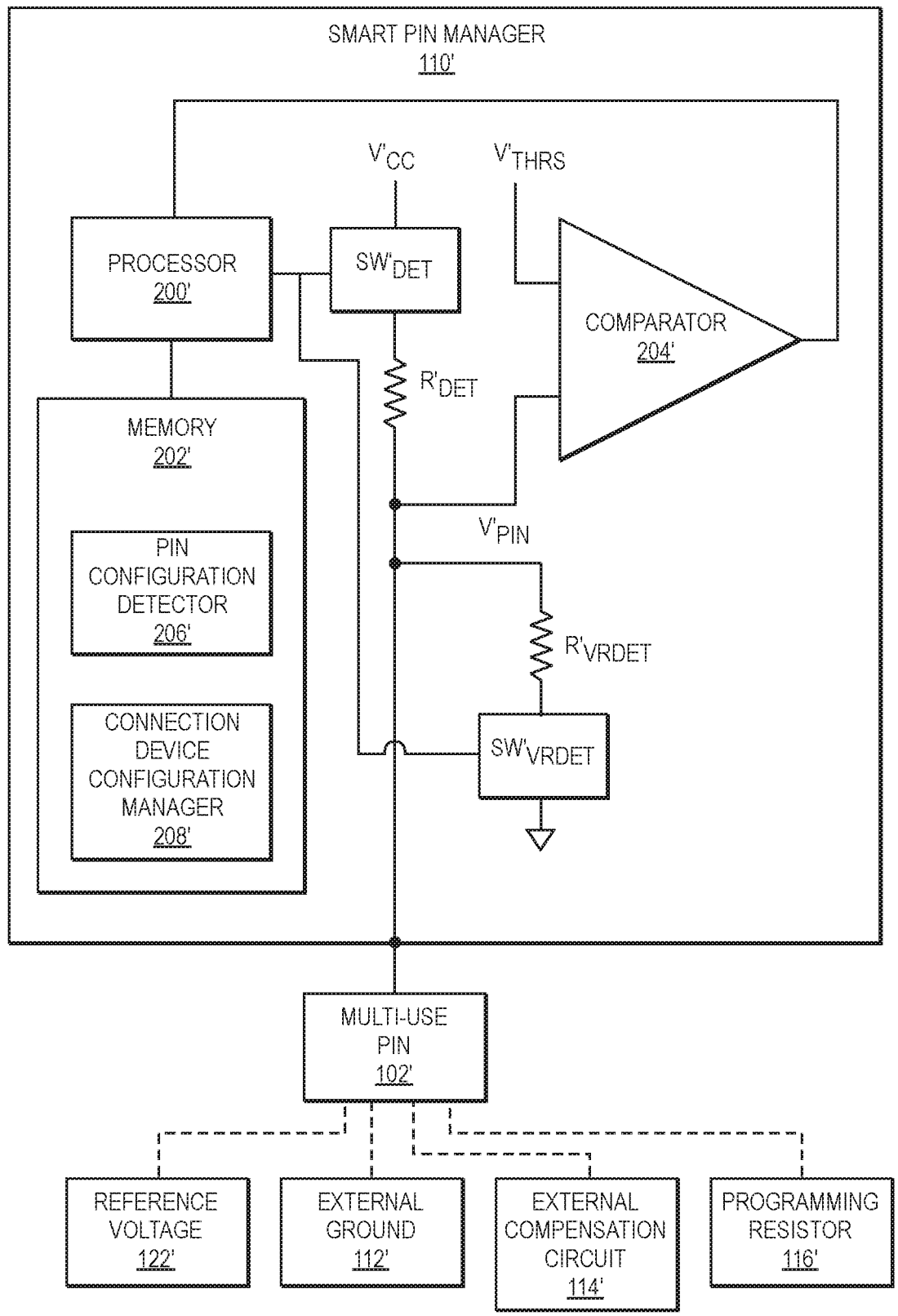
FIG. 5B is a block diagram representation of an embodiment of a smart pin manager for an embodiment of a voltage regulation system including a multi-use pin.

Referring to FIG. 5B, an embodiment of a smart pin manager 110' of an embodiment of a voltage regulation system 100' including a multi-use pin 102' is shown. The smart pin manager 110' is electrically coupled to the multi-use pin 102' and the connection devices $SW'_{IGND}$, $SW'_{EGND}$, $SW'_{ICC/PROGR}$, $SW'_{ECC}$, $SW'_{IVREF}$, $SW'_{EVREF}$. The smart pin manager 110' determines whether the multi-use pin 102' is electrically coupled to an external ground 112', an external compensation circuit 114', a programmable resistor 116' or a reference voltage 122' and responsively manipulates one or more of the connection devices $SW'_{IGND}$, $SW'_{EGND}$, $SW'_{ICC/PROGR}$, $SW'_{ECC}$, $SW'_{IVREF}$, $SW'_{EVREF}$ based on the determination. The connection devices $SW'_{IGND}$, $SW'_{EGND}$, $SW'_{ICC/PROGR}$, $SW'_{ECC}$, $SW'_{IVREF}$, $SW'_{EVREF}$ include an internal ground connection device $SW'_{IGND}$, an external ground connection device SW'EGND, an internal compensation circuit/programmable resistor connection device $SW'_{ICC/PROGR}$, an external compensation circuit connection device $SW'_{ECC}$, an internal reference voltage connection device $SW'_{IVREF}$, and an external reference voltage connection device $SW'_{EVREF}$.

When the internal ground connection device $SW'_{IGND}$ is in a disconnecting (e.g., open) state, the internal ground connection device $SW'_{IGND}$ electrically disengages the ground set point from an internal ground. When the internal ground connection device $SW'_{IGND}$ is in a connecting (e.g., closed) state, the internal ground connection device $SW'_{IGND}$ electrically couples the ground set point to the internal ground.

When the external ground connection device $SW'_{EGND}$ is in a disconnecting (e.g., open) state, the external ground connection device $SW'_{EGND}$ electrically disengages the ground set point from the multi-use pin 102'. When the external ground connection device $SW'_{EGND}$ is in a connecting (e.g., closed) state, the external ground connection device $SW'_{EGND}$ electrically couples the ground set point to the multi-use pin 102'. When an external ground 112' is electrically coupled to the multi-use pin 102', closing the external ground connection device $SW'_{EGND}$ electrically couples the ground set point to the external ground 112' via the multi-use pin 102'.

When one of the internal ground connection device $SW'_{IGND}$ and the external ground connection device $SW'_{EGND}$ is in a disconnecting (e.g., open) state, the other one of the internal ground connection device $SW'_{IGND}$ and the external ground connection device $SW'_{EGND}$ is in a connecting (e.g., closed) state. In an embodiment, a default state for the internal ground connection device $SW'_{IGND}$ is the connecting state and a default state for the external ground connection device $SW'_{EGND}$ is the disconnecting state.

When the internal compensation circuit/programmable resistor connection device $SW'_{ICC/PROGR}$ is in a disconnecting state, the internal compensation circuit/programmable resistor connection device $SW'_{ICC/PROM}$ electrically disengages the voltage regulation controller 106' from the internal compensation circuit 120'. When the internal compensation circuit/programmable resistor connection device $SW'_{ICC/PROGR}$ is in a connecting state, the internal compensation circuit/programmable resistor connection device $SW'_{ICC/PROGR}$ electrically couples the voltage regulation controller to the internal compensation circuit.

When the external compensation circuit connection device $SW'_{ECC}$ is in a disconnecting state, the voltage regulation controller 106' is disengaged from the multi-use pin 102'. When the external compensation circuit connection device $SW'_{ECC}$ is in a connecting state, the voltage regulation controller 106' is electrically coupled to the multi-use pin 102'.

The external compensation circuit connection device $SW'_{ECC}$ is in the connecting state when the multi-use pin 102' has been electrically coupled to an external compensation circuit 114'. In an embodiment, a default state for the internal compensation circuit $SW'_{ICC/PROG}$ is a connecting state and a default state for the external compensation circuit connection device $SW'_{ECC}$ is a disconnecting state. In an embodiment, the voltage regulation controller 106' is electrically coupled to the multi-use pin 102' when an external compensation circuit 114' has been electrically coupled to the multi-use pin 102'.

If an external compensation circuit 114' has not been electrically coupled to the multi-use pin 102' the voltage regulation controller 106' is electrically coupled to the internal compensation circuit 120'. In other words, when a reference voltage 122', an external ground 112', or a programmable resistor 116' has been electrically coupled to the multi-use pin 102', the external compensation circuit connection device $SW'_{ECC}$ is in a disconnecting state thereby disengaging the multi-use pin 102' from the voltage regulation controller 106' and the internal compensation circuit/programmable resistor connection device $SW'_{ICC/PROM}$ is in a connecting state thereby electrically coupling the internal compensation circuit 120' with the voltage regulation controller 106'.

When the reference voltage connection device SW'EVREF is in a disconnecting state, the voltage regulation controller is disengaged from the multi-use pin 102'. When the external reference voltage connection device $SW'_{EVREF}$ is in a connecting state, the external reference voltage connection device $SW'_{EVREF}$ electrically couples the voltage regulation controller to the reference voltage 122' via the multi-use pin 102'. If the external reference voltage connection device $SW'_{EVREF}$ is in a disconnecting state then the internal reference voltage connection device $SW'_{IVREF}$ is in a connecting state thereby coupling the internal reference voltage circuit with the voltage regulation controller.

While a particular configuration of connection devices SW'IGND, SW'EGND, $SW'_{ICC/PROGR}$, $SW'_{ECC}$, $SW'_{IVREF}$, $SW'_{EVREF}$ is described, other configurations of connection devices may be used in the voltage regulation system.

As previously discussed, the smart pin manager 110' is electrically coupled to the multi-use pin 102'. In an embodiment, the smart pin manager 110' determines whether the multi-use pin 102' is electrically coupled to an external ground 112', an external compensation circuit 114', a programmable resistor 116', or a reference voltage 122' and responsively manipulates one or more of the connection devices $SW'_{IGND}$, $SW'_{EGND}$, $SW'_{ICC/PROGR}$, $SW'_{ECC}$, $SW'_{IVREF}$, $SW'_{EVREF}$ based on the determination.

In an embodiment, the smart pin manager 110' includes at least one processor 200', at least one memory 202', a detection connection device $SW'_{DET}$, a reference voltage detection connection device $SW'_{VRDET}$, and a comparator 204'. A pin configuration detector 206' and a connection device configuration manager 208' respectively store their configurations in the memory 202'. The at least one processor 200' is electrically coupled to the at least one memory 202'. In embodiments, the pin configuration detector 206' and the connection device configuration manager 208' represent executable instructions (e.g., program code) that perform specified tasks as more fully described below when executed on the processor 200'.

The detection connection device SW'DET is electrically coupled to the multi-use pin 102' and configured to be electrically coupled to a voltage source V'$_{CC}$. When the detection connection device SW'$_{DET}$ is in a connecting state, the multi-use pin 102' is electrically coupled to the voltage source V'$_{CC}$. When the detection connection device SW'DET is in a disconnecting state, the multi-use pin 102' is electrically disengaged from the voltage source V'$_{CC}$. In an embodiment, a resistor R'$_{DET}$ is disposed between the detection connection device SW'$_{DET}$ and the multi-use pin 102'.

The reference voltage detection connection device SW'$_{VRDET}$ is electrically coupled to the multi-use pin 102' and is configured to be electrically coupled to a ground. When the reference voltage detection connection device SW'$_{VRDET}$ is in a connecting state, the multi-use pin 102' is electrically coupled to ground. When the reference voltage detection connection device SW'$_{VRDET}$ is in a disconnecting state, the multi-use pin 102' is electrically disengaged from ground. In an embodiment, a voltage reference resistor R'$_{VRDET}$ is disposed between the reference voltage detection connection device SW'$_{VRDET}$ and the multi-use pin 102'.

The comparator 204' has a first input electrically coupled to the multi-use pin 102' and a second input electrically coupled to a threshold voltage V'$_{THRS}$ source. The output of the comparator 204' is electrically coupled to the processor 200'. The comparator 204' is configured to receive the voltage V'$_{PIN}$ at the multi-use pin 102' and the threshold voltage V'$_{THRS}$ as inputs and responsively generate an output based on a comparison of the voltage V'$_{PIN}$ at the multi-use pin 102' with the threshold voltage V'$_{THRS}$.

In an embodiment, the pin configuration detector 206' determines whether the multi-use pin 102' is electrically coupled to an external ground 112', to an external compensation circuit 114', to a programmable resistor 116', or to a reference voltage 122'. The connection device configuration manager 208' manages the configuration of the connection devices SW'$_{IGND}$, SW'$_{EGND}$, SW'$_{ICC/PROGR}$, SW'$_{ECC}$, SW'$_{IVREF}$, SW'$_{EVREF}$ based on determination made by the pin configuration detector 206'.

A method of detecting whether the multi-use pin 102' of an embodiment of a voltage regulation system 100' is electrically coupled to a reference voltage 122', an external ground 112', an external compensation circuit 114', or a programmable resistor 116' to the multi-use pin 102' is described. In an embodiment, the pin configuration detector 206' places the reference voltage detection connection device SW'$_{VRDET}$ in the connecting state and the detection connection device SW'$_{DET}$ in the disconnecting state for a reference voltage evaluation time period. In an embodiment, a default state for the detection connection device SW'$_{DET}$ is the disconnecting state. Placing the reference voltage detection connection device SW'$_{VRDET}$ in the connecting state electrically couples the multi-use pin 102' to ground via the reference voltage detection connection device SW'$_{VRDET}$ and the voltage reference resistor R'$_{VRDET}$.

Placing the reference voltage detection connection device SW'$_{VRDET}$ in the connecting state for the reference voltage evaluation time period enables the multi-use pin 102' to discharge to ground in the event the multi-use pin 102' has been connected to a pre-charged external capacitor of an external compensation circuit 114'. In an embodiment, the reference voltage evaluation time period is selected based on the time that it takes for possible values of an external capacitor of an external compensation circuit 114' that may be electrically coupled to the multi-use pin 102' to discharge. For instance, in an example where C$_{COMP}$ is equal to about nine and one-half nano-farads (9.5 nF), R$_{COMP}$ is equal to about eight kiloohms (8 kOhm), R$_{VRDET}$ is equal to about twelve kiloohms (12 kOhm), and C$_{COMP}$ is pre-charged to about three volts (3 V), then it can take about three hundred and forty microseconds (340 µs) for an external capacitor of an external compensation circuit 114' to be discharged to about one-half volt (0.5 V). In an embodiment, the threshold voltage V'$_{THRS}$ is determined based on the value of possible reference voltages 112' that may be electrically coupled to the multi-use pin 102' such that the value of the possible values of the reference voltages 112' is greater than the value of the threshold voltage V'$_{THRS}$.

The pin configuration detector 206' connects the detection connection device SW'$_{DET}$ and disconnects the reference voltage detection connection device SW'$_{VRDET}$ thereby electrically coupling the multi-use pin 102' to the voltage source V'$_{CC}$ (e.g., as described with reference to FIG. 3 at 302). The voltage V'$_{PIN}$ at the multi-use pin 102' is received at the first input of the comparator 204'. The threshold voltage V'$_{THRS}$ is supplied to the second input of the comparator 204'. The comparator 204' compares the voltage V'$_{PIN}$ at the multi-use pin 102' with the threshold voltage V'$_{THRS}$ and responsively generates an output based on the comparison. The pin configuration detector 206' determines whether the voltage V'$_{PIN}$ at the multi-use pin 102' is greater than the threshold voltage V'$_{THRS}$ after the reference voltage evaluation time period has elapsed based on the output generated by the comparator 204'.

If the pin configuration detector 206' determines that the voltage V'$_{PIN}$ at the multi-use pin 102' is greater than the threshold voltage V'$_{THRS}$ after the reference voltage evaluation time period has elapsed, the pin configuration detector 206' determines that the multi-use pin 102' has been electrically coupled to the reference voltage 122'. The pin configuration detector 206' informs the connection device configuration manager 208' that the multi-use pin 102' has been electrically coupled to a reference voltage 122'. The reference voltage 122' is supplied to the voltage regulation controller to perform voltage regulation functions using the reference voltage 122'.

If the pin configuration detector 206' determines that the voltage V'$_{PIN}$ at the multi-use pin 102' is less than the threshold voltage V'$_{THRS}$ after the reference voltage evaluation time period has elapsed, the pin configuration detector 206' determines that the multi-use pin 102' has not been electrically coupled to the reference voltage 122'. The pin configuration detector 206' then determines whether an external ground 112' is electrically coupled to the multi-use pin 102'.

The pin configuration detector 206' places the reference voltage detection connection device SW'$_{VRDET}$ in the disconnecting state and the detection connection device SW'$_{DET}$ in the connecting state thereby electrically coupling the multi-use pin 102' to the voltage source V'$_{CC}$. The voltage V'$_{PIN}$ at the multi-use pin 102' is received at the first input of the comparator at 204'. The threshold voltage V'$_{THRS}$ is supplied to the second input of the comparator 204'. The comparator 204' compares the voltage V'$_{PIN}$ at the multi-use pin 102' with the threshold voltage V'$_{THRS}$ and responsively generates an output based on the comparison. The pin configuration detector 206' determines whether the voltage V'$_{PIN}$ at the multi-use pin 102' is greater than the threshold voltage V'$_{THRS}$ based on the output generated by the comparator 204' (e.g., as described with reference to FIG. 3 at 304). In an embodiment, the pin configuration detector 206' makes the determination at a first evaluation time $T'_{EVAL1}$ following the closing of the detection connection device $SW'_{DET}$.

If the pin configuration detector 206' determines that the voltage $V'_{PIN}$ at the multi-use pin 102' is not greater than the threshold voltage $V'_{THRS}$ at the time $T'_{EVAL1}$, the pin configuration detector 206' determines that the multi-use pin 102' has been electrically coupled to an external ground 112' (e.g., as described with reference to FIG. 3 at 306). When the multi-use pin 102' is connected to an external ground 112', the voltage $V'_{PIN}$ at the multi-use pin 102' fails to rise above the threshold voltage $V'_{THRS}$. The pin configuration detector 206' informs the connection device configuration manager 208' that the multi-use pin 102' has been electrically coupled to an external ground 112'.

If the pin configuration detector 206' determines that the voltage $V'_{PIN}$ at the multi-use pin 102' is greater than the threshold voltage $V'_{THRS}$ at the time $T'_{EVAL1}$, the pin configuration detector 206' determines whether an external compensation circuit 114' is electrically coupled to the multi-use pin 102' (e.g., as described with reference to FIG. 3 at 304).

If the pin configuration detector 206' determines that the voltage $V'_{PIN}$ at the multi-use pin 102' is greater than the threshold voltage $V'_{THRS}$ at the first evaluation time $T'_{EVAL1}$, the pin configuration detector 206' disconnects the detection connection device SW'DET (e.g., as described with reference to FIG. 3 at 308). The pin configuration detector 206' determines whether the voltage V'PIN at the multi-use pin 102' is greater than the threshold voltage $V'_{THRS}$ at the second evaluation time $T'_{EVAL2}$ (e.g., as described with reference to FIG. 3 at 310). When the multi-use pin 102' is electrically coupled to an external compensation circuit 114', upon the disconnection of the detection connection device $SW'_{DET}$, the multi-use pin 102' is in a floating state and the voltage $V'_{PIN}$ remains above the threshold voltage $V'_{THRS}$.

If the pin configuration detector 206' determines that the voltage $V'_{PIN}$ at the multi-use pin 102' is greater than the $V'_{THRS}$ at the second evaluation time $T'_{EVAL2}$, the pin configuration detector 206' determines that the multi-use pin 102' has been electrically coupled to an external compensation circuit 114' (e.g., as described with reference to FIG. 3 at 312). The pin configuration detector 206' informs the connection device configuration manager 208' that the multi-use pin 102' has been electrically coupled to an external compensation circuit 114'.

If the pin configuration detector 206' determines that the voltage $V'_{PIN}$ at the multi-use pin 102' is not greater than the threshold voltage $V'_{THRS}$ at the second evaluation time $T'_{EVAL2}$, the pin configuration detector 206' determines that the multi-use pin 102' has been electrically coupled to a programmable resistor 116' (e.g., as described with reference to FIG. 3 at 314). The pin configuration detector 206' informs the connection device configuration manager 208' that the multi-use pin 102' has been electrically coupled to a programmable resistor 116'. The pin configuration detector 206' informs the connection device configuration manager 208' of the value $R'_{PROG}$ of the programmable resistor 116' that has been electrically coupled to the multi-use pin 102 (e.g., as described with reference to FIG. 3 at 316).

While a series of steps have been described in connection with the method, a fewer number of the described steps and/or additional steps may be performed. Furthermore, while the steps have been described in a particular order, the steps in method 300 may be performed in a different order.

Figure 5C:
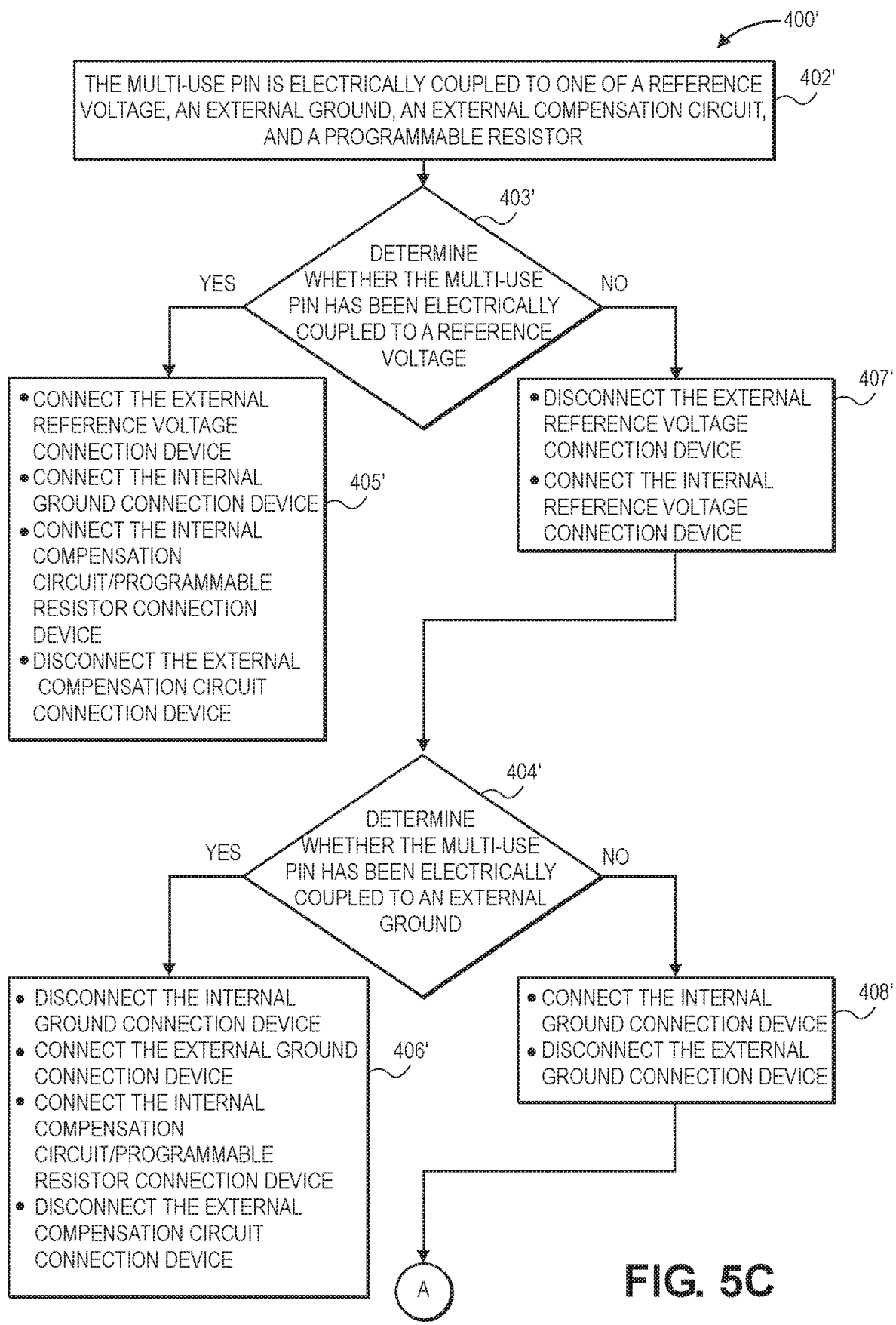
FIG. 5C is a flow diagram representation of an example of a method using an embodiment of a voltage regulation system including a multi-use pin.
Figure 5D:
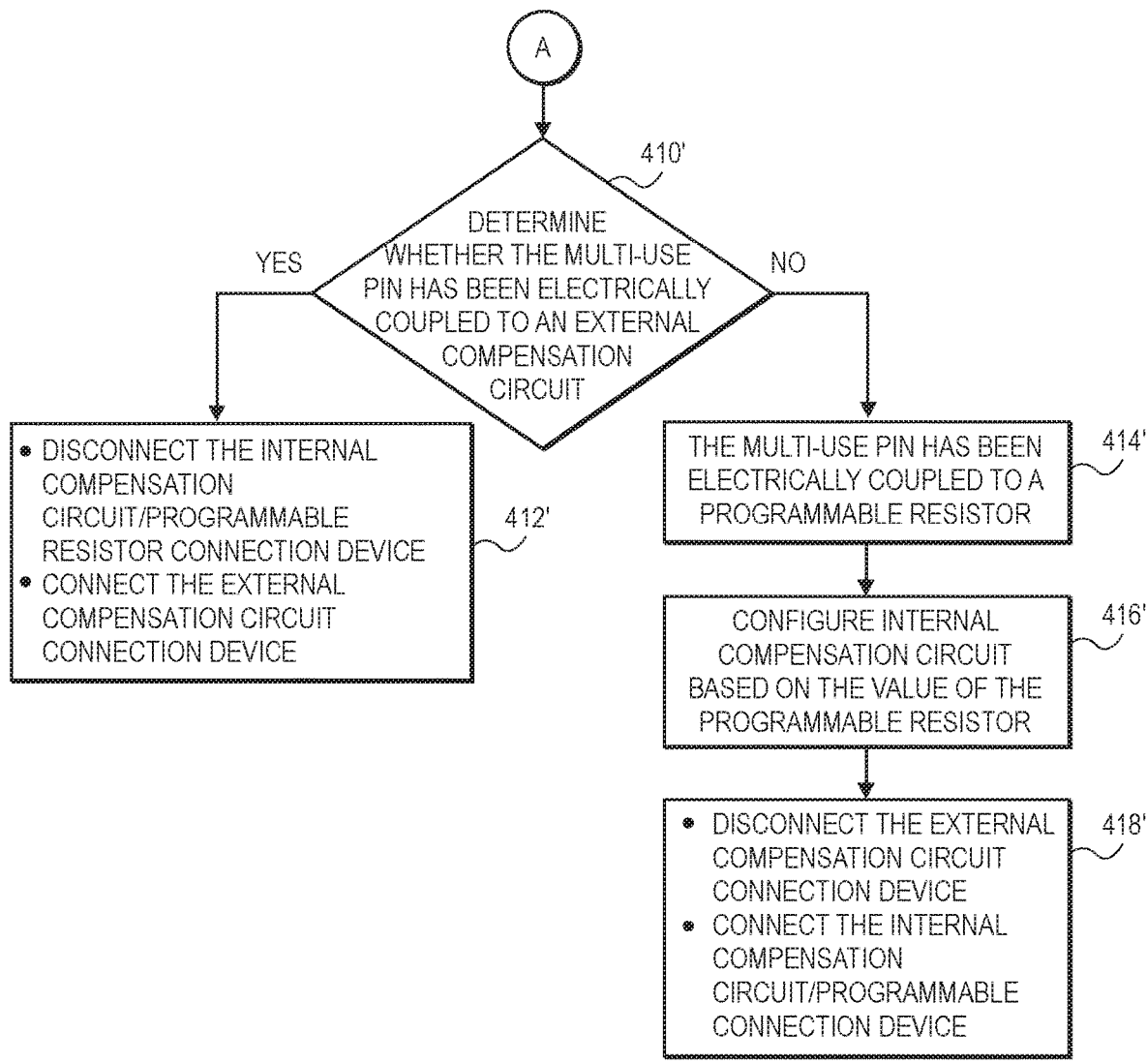
FIG. 5D is a continuation of the flow diagram representation of FIG. 5C.

Referring to FIGS. 5C and 5D, a flow chart representation of a method 400' of using the voltage regulation system 100' with the multi-use pin 102' is described. The multi-use pin 102' is electrically coupled to one of a reference voltage 122', an external ground 112', an external compensation circuit 114', and a programmable resistor 116' at 402'.

The pin configuration detector 206' determines whether the multi-use pin 102' has been electrically coupled to a reference voltage 122' at 403'. If the pin configuration detector 206' determines that the multi-use pin 102' has been electrically coupled to a reference voltage 122', the connection device configuration manager 208' connects the external reference voltage connection device $SW'_{EVREF}$ thereby electrically coupling the voltage regulation controller to the reference voltage 122' via the multi-use pin 102'. The connection device configuration manager 208' connects the internal ground connection device $SW'_{IGND}$ thereby electrically coupling the ground set point 108' to the internal ground 118', connects the internal compensation circuit/programmable resistor connection device $SW'_{ICC/PROM}$ thereby electrically coupling the internal compensation circuit to the voltage regulation controller, and disconnects the external compensation circuit connection device $SW_{ECC}$ thereby disengaging the voltage regulation controller from the multi-use pin 102' at 405'.

If the pin configuration detector 206' determines that the multi-use pin 102' has not been electrically coupled to a reference voltage 122', the connection device configuration manager 208' disconnects the external reference voltage connection device $SW'_{EVREF}$ thereby electrically disengaging the voltage regulation controller from the multi-use pin 102' and connects the internal reference voltage connection device $SW'_{IVREF}$ at 407'. The pin configuration detector 206' then determines whether the multi-use pin 102' has been electrically coupled to an external ground 112' at 404'.

If the pin configuration detector 206' determines that the multi-use pin 102' has been electrically coupled to an external ground 112', the connection device configuration manager 208' disconnects the internal ground connection device $SW'_{IGND}$ thereby electrically disengaging the internal ground 118' from the ground set point 108', connects the external ground connection device $SW'_{EGND}$ thereby electrically coupling the external ground 112' to the ground set point 108' via the multi-use pin 102', connects the internal compensation circuit/programmable resistor connection device $SW'_{ICC/PROGR}$ thereby electrically coupling the internal compensation circuit to the voltage regulation controller, and disconnects the external compensation circuit connection device $SW'_{ECC}$ thereby disengaging the voltage regulation controller from the multi-use pin 102' at 406'.

If the pin configuration detector 206' determines that the multi-use pin 102' has not been electrically coupled to an external ground 112', the connection device configuration manager 208' connects the internal ground connection device $SW'_{IGND}$ thereby electrically coupling the ground set point 108' to the internal ground 118' and disconnects the external ground connection device SW'EGND thereby electrically disengaging the multi-use pin 102' from the ground set point 108' at 408'.

The pin configuration detector 206' determines whether the multi-use pin 102' has been electrically coupled to an external compensation circuit 114' at 410'. If the pin configuration detector 206' determines that the multi-use pin 102' has been electrically coupled to an external compensation circuit 114', the connection device configuration manager 208' disconnects the internal compensation circuit/programmable resistor connection device $SW'_{ICC/PROM}$ thereby electrically disengaging the internal compensation circuit from the voltage regulation controller and connects the external compensation circuit connection device $SW'_{ECC}$ thereby electrically coupling the external compensation circuit 114' to the voltage regulation controller via the multi-use pin 102' at 412'. The voltage regulation controller uses the external compensation circuit 114' to perform voltage regulation functions.

If the pin configuration detector 206' determines that the multi-use pin 102' has not been electrically coupled to an external compensation circuit 114', the pin configuration detector 206' determines that the multi-use pin 102' has been electrically coupled to a programmable resistor 116' at 414'. The pin configuration detector 206' supplies the value of the programmable resistor 116' to the connection device configuration manager 208'. The connection device configuration manager 208' configures the internal compensation circuit 120' based on the received value of the programmable resistor 116' at 416'.

The connection device configuration manager 208' connects the internal compensation circuit/programmable resistor connection device $SW'_{ICC/PROM}$ thereby electrically coupling the configured internal compensation circuit 120' to the voltage regulation controller 106' and disconnects the external compensation circuit connection device $SW'_{ECC}$ thereby electrically disengaging the multi-use pin 102' from the voltage regulation controller 106' at 418'.

While a series of steps have been described in connection with the method, a fewer number of the described steps and/or additional steps may be performed. Furthermore, while the steps have been described in a particular order, the steps in method may be performed in a different order.

Example Operating Environment

Figure 6:
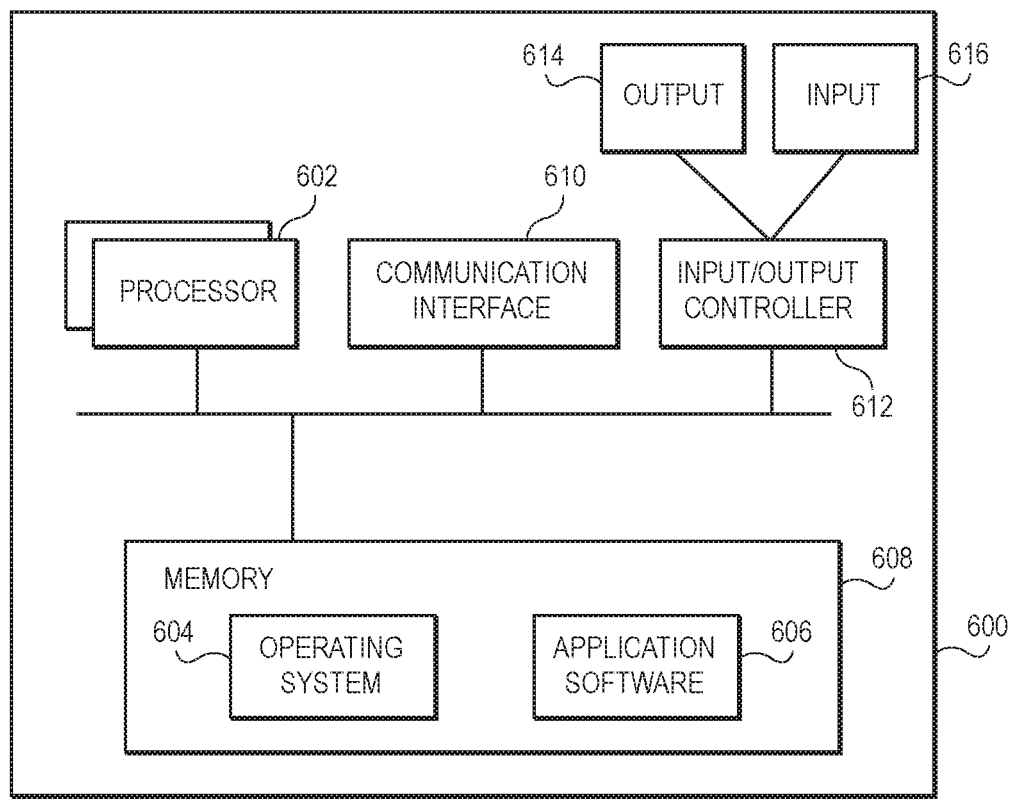
FIG. 6 is a block diagram representation of an example controller for an embodiment of a voltage regulation system including a multi-use pin.

Referring to FIG. 6, a functional block diagram representation of an example controller 600 is shown. In an embodiment, components of the controller 600 may be implemented as a part of an electronic device, a computing device, a voltage regulation system 100, a voltage regulation controller 106, or a smart pin manager 110, 110' according to one or more embodiments described in this specification. The controller 600 comprises one or more processors 602 which may be microprocessors, controllers, or any other processors for processing computer executable instructions to control the operation of an electronic device. Platform software including an operating system 604 or any other platform software may be provided on the computing apparatus 600 to enable application software 606 to be executed on the device.

Computer executable instructions may be provided using any computer-readable media that are accessible by the controller 600. Computer-readable media may include, for example, computer storage media, such as a memory 608 and communications media. Computer storage media, such as a memory 608, include volatile and non-volatile, removable and non-removable, media implemented in any method or technology for storage of information, such as computer readable instructions, data structures, program modules, and so forth. Computer storage media include, but are not necessarily limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a controller 600. Communication media may embody computer readable instructions, data structures, program modules, and so on in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 608) is shown within the controller 600, it will be appreciated that storage may be distributed or located remotely and accessed via a network or other communication link (e.g. using a communication interface 610).

The controller 600 may comprise an input/output controller 612 configured to output information to one or more output devices 614, for example a display or a speaker, which may be separate from or integral to the electronic device. The input/output controller 612 may also be configured to receive and process an input from one or more input devices 616, for example, a keyboard, a microphone, or a touchpad. In one embodiment, the output device 614 may also act as the input device. An example of such a device may be a touch sensitive display. The input/output controller 612 may also output data to devices other than the output device 614, e.g. a locally connected printing device.

The functionality described herein can be performed, at least in part, by one or more hardware logic components. According to an embodiment, the controller 600 is configured by the program code when executed by the processor 602 to execute the embodiments of the operations and functionality described. The functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to "an" item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A voltage regulation system comprising:
a voltage regulator;
a voltage regulation controller electrically coupled to the voltage regulator;
a multi-use pin configured to be electrically coupled to one of a plurality of external circuits;
a plurality of connection devices configured to be in a plurality of connection device configurations, each one of the plurality of connection device configurations enabling an associated one of the plurality of external circuits via the multi-use pin; and
a smart pin manager electrically coupled to the multi-use pin, the plurality of connection devices, and the voltage regulation controller, the smart pin manager configured to
determine when the multi-use pin is electrically coupled to one of the plurality of external circuits, and
cause the plurality of connection devices to be in one of the plurality of connection device configurations to enable the associated one of the plurality of external circuits based upon the determination.

2. The voltage regulation system as recited in claim 1, further comprising:
a detection connection device configured to be electrically coupled to the multi-use pin and a voltage source, the detection connection device configured to switch between a disconnected state and a connected state so that, when the detection connection device is in the connected state, the multi-use pin is electrically coupled to the voltage source, and when the detection connection device is in the disconnected state, the multi-use pin is electrically disengaged from the voltage source; and
a comparator having a first input electrically coupled to the multi-use pin to receive a voltage at the multi-use pin and a second input electrically coupled to a threshold voltage source to receive a threshold voltage, the comparator configured to compare the voltage at the multi-use pin and the threshold voltage and generate an output signal based upon the comparison,
wherein the smart pin manager is configured to cause the detection connection device to be in the connected state to determine when the multi-use pin has been electrically coupled to one of the plurality of external circuits based upon the output signal of the comparator, and to cause the plurality of connection devices to be in one of the plurality of connection device configurations based upon the determination.

3. The voltage regulation system as recited in claim 2, further comprising a reference voltage detection connection device electrically coupled to the multi-use pin and configured to be electrically coupled to a ground, the reference voltage detection connection device configured to switch between a disconnected state and a connected state so that, when the reference voltage detection connection device is in the connected state, the multi-use pin is electrically coupled to the ground, and when the reference voltage detection connection device is in the disconnected state, the multi-use pin is electrically disengaged from the ground, wherein placing the reference voltage detection connection device in the connected state enables the multi-use pin to discharge to the ground.

4. The voltage regulation system as recited in claim 1, wherein at least one device of the plurality of connection devices comprises a switch.

5. The voltage regulation system as recited in claim 4, wherein the switch comprises a transistor switch.

6. The voltage regulation system as recited in claim 1, wherein the plurality of external circuits comprises at least one of an external ground, an external compensation circuit, a programmable resistor, or an external reference voltage.

7. The voltage regulation system as recited in claim 1, wherein the smart pin manager is included with the voltage regulation controller.

8. A smart pin manager for a voltage regulation system employing a multi-use pin, the smart pin manager comprising:
a processor;
a detection connection device configured to be electrically coupled to a multi-use pin and a voltage source, the detection connection device configured to switch between a disconnected state and a connected state so that, when the detection connection device is in the connected state, the multi-use pin is electrically coupled to the voltage source, and when the detection connection device is in the disconnected state, the multi-use pin is electrically disengaged from the voltage source;
a comparator having a first input electrically coupled to the multi-use pin to receive a voltage at the multi-use pin, a second input electrically coupled to a threshold voltage source to receive a threshold voltage, and an output electrically coupled to the processor, the comparator configured to compare the voltage at the multi-use pin and the threshold voltage and generate an output signal for the processor based upon the comparison; and
a non-transitory computer-readable storage medium having computer executable instructions stored thereon for execution by the processor, the computer executable instructions comprising:
causing the detection connection device to be in the connected state to determine when the multi-use pin has been electrically coupled to one of a plurality of external circuits based upon the output signal of the comparator received by the processor, and
causing a plurality of connection devices to be in one of a plurality of connection device configurations based upon the determination, each one of the plurality of connection device configurations enabling an associated one of the plurality of external circuits via the multi-use pin.

9. The smart pin manager as recited in claim 8, further comprising a reference voltage detection connection device electrically coupled to the multi-use pin and configured to be electrically coupled to a ground, the reference voltage detection connection device configured to switch between a disconnected state and a connected state so that, when the reference voltage detection connection device is in the connected state, the multi-use pin is electrically coupled to the ground, and when the reference voltage detection connection device is in the disconnected state, the multi-use pin is electrically disengaged from the ground, wherein placing the reference voltage detection connection device in the connected state enables the multi-use pin to discharge to the ground.

10. The smart pin manager as recited in claim 8, wherein the detection connection device comprises a switch.

11. The smart pin manager as recited in claim 10, wherein the switch comprises a transistor switch.

12. The smart pin manager as recited in claim 8, wherein the plurality of external circuits comprises at least one of an external ground, an external compensation circuit, a programmable resistor, or an external reference voltage.

13. The smart pin manager as recited in claim 8, wherein the smart pin manager is included with a voltage regulation controller.

14. A method comprising:
causing a plurality of connection devices to be in one of a plurality of connection device configurations, each one of the plurality of connection device configurations enabling an associated one of a plurality of external circuits via a multi-use pin;
determining, by a smart pin manager, when the multi-use pin is electrically coupled to one of the plurality of external circuits, the smart pin manager electrically coupled to the multi-use pin, the plurality of connection devices, and a voltage regulation controller; and
causing, by the smart pin manager, the plurality of connection devices to be in one of the plurality of connection device configurations to enable the associated one of the plurality of external circuits based upon the determination.

15. The method as recited in claim 14, further comprising:
switching a detection connection device electrically coupled to the multi-use pin between a disconnected state and a connected state so that, when the detection connection device is in the connected state, the multi-use pin is electrically coupled to a voltage source, and when the detection connection device is in the disconnected state, the multi-use pin is electrically disengaged from the voltage source;
receiving, at a first input of a comparator, a voltage at the multi-use pin;
receiving, at a second input of the comparator, a threshold voltage;
comparing, by the comparator, the voltage at the multi-use pin and the threshold voltage and generating an output signal based upon the comparison;
causing the detection connection device to be in the connected state to determine when the multi-use pin has been electrically coupled to one of the plurality of external circuits based upon the output signal of the comparator; and
causing the plurality of connection devices to be in one of the plurality of connection device configurations based upon the determination to enable an associated one of the plurality of external circuits via the multi-use pin.

16. The method as recited in claim 15, further comprising:
switching a reference voltage detection connection device electrically coupled to the multi-use pin and a ground between a disconnected state and a connected state so that, when the reference voltage detection connection device is in the connected state, the multi-use pin is electrically coupled to the ground, and when the reference voltage detection connection device is in the disconnected state, the multi-use pin is electrically disengaged from the ground, wherein switching the reference voltage detection connection device to the connected state enables the multi-use pin to discharge to the ground.

17. The method as recited in claim 14, wherein at least one device of the plurality of connection devices comprises a switch.

18. The method as recited in claim 17, wherein the switch comprises a transistor switch.

19. The method as recited in claim 14, wherein the plurality of external circuits comprises at least one of an external ground, an external compensation circuit, a programmable resistor, or an external reference voltage.

20. The method as recited in claim 14, wherein the smart pin manager is included with the voltage regulation controller.

* * * * *